United States Patent
Uono et al.

(10) Patent No.: US 7,268,445 B2
(45) Date of Patent: Sep. 11, 2007

(54) VEHICULAR OCCUPANT PROTECTION DEVICE

(75) Inventors: Yutaka Uono, Kuwana (JP); Makoto Aso, Nishikamo-gun (JP)

(73) Assignee: DENSO CORPORATION, Kariya (JP)

( * ) Notice: Subject to any disclaimer, the term of this patent is extended or adjusted under 35 U.S.C. 154(b) by 289 days.

(21) Appl. No.: 11/075,660

(22) Filed: Mar. 10, 2005

(65) Prior Publication Data

US 2005/0200203 A1    Sep. 15, 2005

(30) Foreign Application Priority Data

Mar. 12, 2004    (JP)    ............................. 2004-070888

(51) Int. Cl.
*B06L 3/00* (2006.01)
*F42B 3/18* (2006.01)

(52) U.S. Cl. .................................. 307/10.1; 102/202.2

(58) Field of Classification Search ............... 307/10.1, 307/9.1; 102/202.1, 206
See application file for complete search history.

(56) References Cited

U.S. PATENT DOCUMENTS

| | | | | |
|---|---|---|---|---|
| 4,061,088 A | * | 12/1977 | Ueda ....................... 102/202.4 |
| 4,504,082 A | * | 3/1985 | Brown et al. ................ 280/735 |
| 5,805,058 A | * | 9/1998 | Saito et al. .................. 340/436 |
| 5,898,122 A | * | 4/1999 | Davis et al. ................. 102/206 |
| 6,192,802 B1 | * | 2/2001 | Baginski ................... 102/202.2 |
| 6,465,907 B2 | * | 10/2002 | Ueno et al. ................. 307/10.1 |
| 7,009,368 B2 | * | 3/2006 | Mayumi ...................... 323/222 |
| 2005/0132919 A1 | * | 6/2005 | Nishimura et al. ...... 102/202.1 |

FOREIGN PATENT DOCUMENTS

| | | |
|---|---|---|
| JP | A-64-73908 | 3/1989 |
| JP | A-2002-135973 | 5/2002 |

* cited by examiner

*Primary Examiner*—Stephen W. Jackson
*Assistant Examiner*—Boris Benenson
(74) *Attorney, Agent, or Firm*—Posz Law Group, PLC

(57) ABSTRACT

An airbag device includes a squib, an ignition circuit, and a noise protection circuit. The noise protection circuit includes two zener diodes whose cathodes are facing each other and connected with each other. Further, the noise protection circuit is connected in parallel with the ignition element to thereby protect the ignition circuit from noise. This decreases the number of components in the noise protection circuit to thereby achieve the compact and low-cost airbag device.

2 Claims, 4 Drawing Sheets

VEHICULAR OCCUPANT PROTECTION DEVICE

CROSS REFERENCE TO RELATED APPLICATIONS

This application is based on and incorporates herein by reference Japanese Patent Application No. 2004-70888 filed on Mar. 12, 2004.

FIELD OF THE INVENTION

The present invention relates to a vehicular occupant protection device.

BACKGROUND OF THE INVENTION

There is a conventional activation device for a vehicular protection system disclosed in Patent Document 1. This activation device includes an acceleration sensor, a micro-computer, a squib (ignition element), two electronic switching elements, and a driving circuit that drives the foregoing components.

Patent Document 1: JP-2001-239916 (US-2001/0006309 A1, U.S. Pat. No. 6,465,907 B2)

The acceleration sensor detects impact from vehicle collision; then, the micro-computer turns on the two electronic switching elements via the driving circuit based on the detection result by the acceleration sensor. Thus, ignition current is conducted to the squib from a direct-current power source to thereby expand an airbag device. An occupant can be thereby securely protected from the impact due to the collision.

Here, the squib and the switching elements are separately disposed and connected with each other via a wire harness. Therefore, they are subject to interference due to inductive noises from various electronic devices mounted in the vehicle, so the switching elements are sometimes damaged because of the inductive noises.

To solve this problem, a noise protection circuit 70 shown in FIG. 4 is provided for protecting the switching elements from the noises. This circuit 70 includes three zener diodes 70a, 70b, 70c. The first zener diode 70a is connected to the squib 60 in parallel: the second and third diodes 70b, 70c are individually connected between either end of the squib 60 and the vehicle body. This structure suppresses voltage variations, due to the inductive noises, between both ends of the squib 60 and between either end of the squib 60 and the vehicle body. The damage of the switching elements 50a, 50b can be thereby prevented. However, this circuit includes three zener diodes that are large and relatively costly, so it is difficult to make this circuit cheap and compact.

SUMMARY OF THE INVENTION

It is an object of the present invention to provide a vehicular occupant protection device that is compact and low in cost by decreasing the number of components while securing the capability of protecting noises.

To achieve the above object, a vehicular occupant protection device is provided with the following. An ignition element is included for being ignited by an ignition current. An ignition circuit is included for supplying the ignition current to the ignition element. A noise protection circuit is included for having two zener diodes so that their cathodes are facing each other and connected with each other. Here, the noise protection circuit is connected in parallel with the ignition element to thereby protect the ignition circuit from noise.

In this structure, the noise protection circuit including the two zener diodes protects the ignition circuit from noise. Further, when noise is conducted and interferes with the ignition element, high voltage is sometimes induced. However, under the above structure, the noise protection circuit including the two zener diodes suppresses the high voltage to the voltage determined by the sum of zener voltage of one zener diode and forward directional voltage of the other zener diode. Therefore, the high voltage is not applied to the ignition circuit electrically connecting to the ignition element, so that this helps prevent the ignition circuit from damage. Further, in comparison with the conventional noise protection circuit including three zener diodes, the number of components is decreased, so that the vehicular occupant protection device can be compact and low in cost while securing the noise protection capability.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
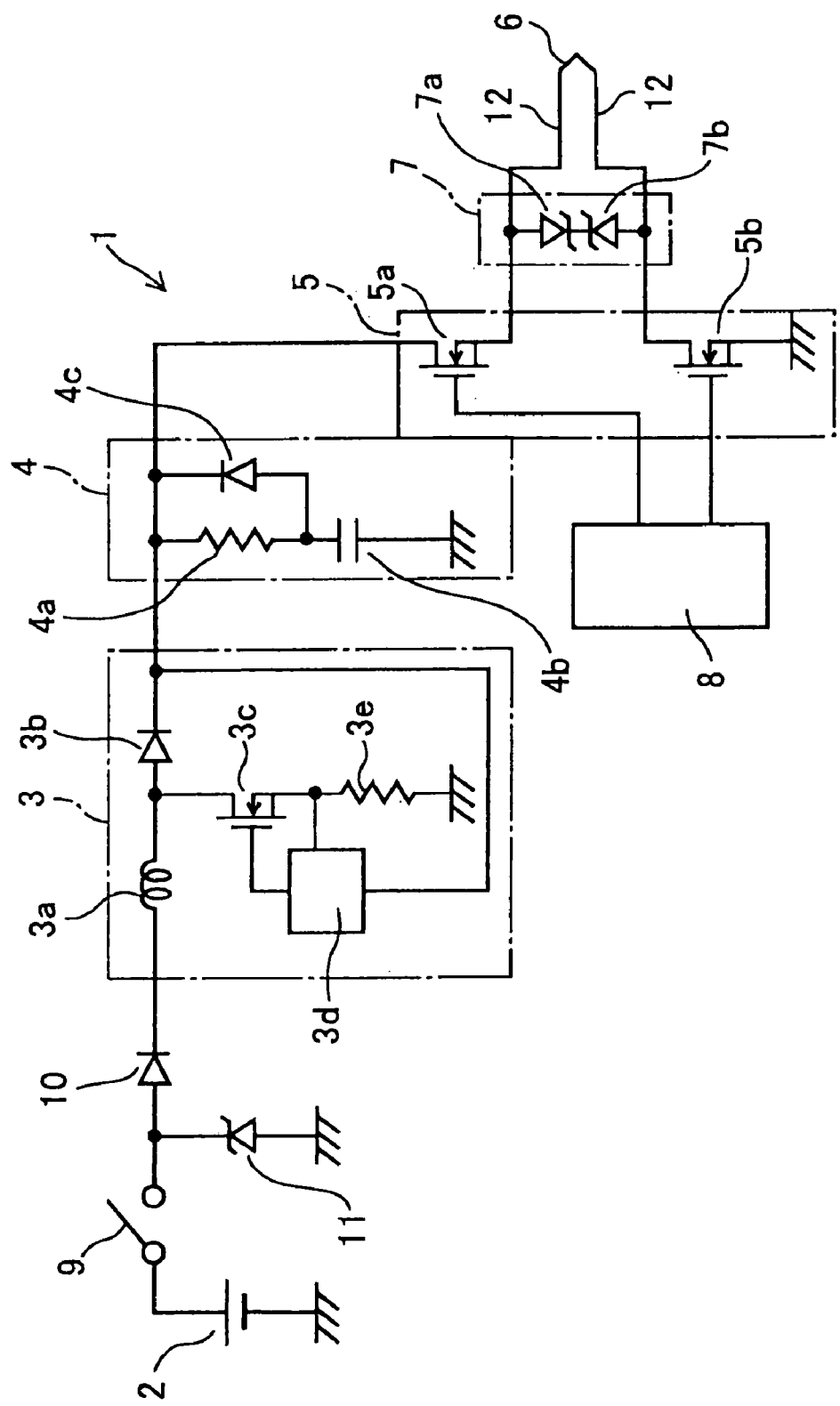
FIG. 1 is a diagram of a circuit of an airbag device according to an embodiment of the present invention.

The present invention of a vehicular occupant protection device is directed to an airbag device, which will be explained with reference to drawings. This airbag device 1 includes a battery 2, a voltage-increase circuit 3, a backup-power circuit 4, an ignition circuit 5, a squib (ignition element) 6, a noise protection circuit 7, and a micro-computer 8.

The battery 2 is, e.g., a direct-current power source. The positive terminal of the battery 2 connects with one end of an ignition switch 9, while the negative terminal is grounded to a vehicle body. The other end of the ignition switch 9 connects with the anode of a diode 10; the cathode of the diode 10 connects with the voltage-increase circuit 3. Further, a zener diode 11 of 35 V or the like is connected between the ignition switch 9 and the diode 10. This zener diode 11 suppresses surge voltage of load-dump surge due to rapid decrease in electrical loads connected to the battery 2.

The voltage-increase circuit 3 increases the voltage of the battery 2 inputted via the ignition switch 9 and the diode 10, to about 27 V. This voltage-increase circuit 3 includes a choke coil 3a, a diode 3b, a field-effect transistor 3c, a transistor driving circuit 3d, and a current detection resistance 3e.

The choke coil 3a accumulates and discharges magnetic energy, and induces voltage. One end of the choke coil 3a connects with the cathode of the diode 10; the other end of the choke coil 3a connects with the anode of the diode 3b; and the cathode of the diode 3b connects with the backup power circuit 4.

The field-effect transistor 3c is a switching element to control current conducted to the choke coil 3a. The drain of the transistor 3c connects with the connecting point between the choke coil 3a and the diode 3b; the gate of the transistor 3c connects with the transistor driving circuit 3d; and the source of the transistor 3c is grounded to the vehicle body via the current detection resistance 3e.

The transistor driving circuit 3d outputs a driving signal for switching the field-effect transistor 3c. One input terminal of the transistor driving circuit 3d connects with the connecting point between the source of the field-effect transistor 3c and the current detection resistance 3e; the other input terminal connects with the cathode of the diode 3b; and the output terminal connects with the gate of the field-effect transistor 3c.

The backup power circuit 4 includes a charge-current limit resistance 4a, a backup capacitor 4b, and a diode 4c to supply ignition current to the squib 6. One end of the charge-current limit resistance 4a connects with the cathode of the diode 3b; the other end connects with one end of the backup capacitor 4b. The other end of the backup capacitor 4b is grounded to the vehicle body. The anode of the diode 4c connects with the connecting point between the resistance 4a and the capacitor 4b; the cathode connects with the one end of the resistance 4a.

The ignition circuit 5 includes two field-effect transistors 5a, 5b to constitute a circuit for supplying ignition current to the squib 6 using output voltage of the backup power circuit 4 inputted via the diode 4c. The field-effect transistors 5a, 5b are switching elements, e.g., with the maximum rated 35 V between the source and the drain, resistant to load-damp surge. The drain of the field-effect transistor 5a connects with the cathode of the diode 4c; the gate connects with the micro-computer 8; the source connects with one end of the squib 6. The drain of the field-effect transistor 5b connects with the other end of the squib 6; the gate connects with the micro-computer 8; and the source is grounded to the vehicle body.

The squib 6 is an ignition element that is ignited by conducting ignition current. Igniting the squib 6 causes the airbag to expand. The squib 6 connects with the source of the field-effect transistor 5a and the gate of the field-effect transistor 5b via a wire harness 12.

The noise protection circuit 7 includes, for instance, two zener diodes 7a, 7b of 27-V zener voltage to protect the ignition circuit 5 from inductive noise conducted via the squib 6 or the wire harness 12. The cathodes of the two zener diodes 7a, 7b are connected in common. The anode of the zener diode 7a connects with the connecting point between the field-effect transistor 5a and the squib 6; the anode of the zener diode 7b connects with the field-effect transistor 5b and the squib 6.

The micro-computer 8 determines ignition timing based on an acceleration signal from an acceleration sensor (not shown) mounted in the vehicle, and generates an ignition signal for driving the ignition circuit 5. Two output terminals of the micro-computer 8 connect with the field-effect transistors 5a, 5b, respectively.

Next, the operation will be explained below. When the ignition switch 9 is tuned on, the voltage of the battery 2 is inputted to the voltage-increase circuit 3 via the ignition switch 9 and the diode 10. The transistor driving circuit 3d compares voltage of the current detection resistance 3e and cathode voltage of the diode 3b with given threshold values, respectively. Based on the comparison results, the transistor driving circuit 3d generates a driving signal for switching the field-effect transistor 3c. The field-effect transistor 3c switches based on the driving signal from the transistor driving circuit 3d. Thus, the voltage-increase circuit 3 increases 12 V of the battery 2 into 27 V to thereby output it. The output voltage of the voltage-increase circuit 3 is applied to the backup capacitor 4b via the charge-current limit resistance 4a of the backup power circuit 4. The voltage of the voltage-increase circuit 3 increases to 27 V by being charged by the output voltage of the voltage-increase circuit 3. Further, the output voltage of the voltage-increase circuit 3 is applied to the ignition circuit 5. The voltage of the backup capacitor 4b is also applied to the ignition circuit 5 via the diode 4c. When the vehicle collides, both the field-effect transistors 5a, 5b of the ignition circuit 5 are turned on based on the ignition signal from the micro-computer 8, so the ignition current flows through the squib 6 to thereby expand the airbag.

Next, measurement results of the terminal voltage of the ignition circuit 5 will be shown below by being compared with those of the prior art with reference to FIGS. 2A, 2B, 3A, 3B. This prior art means the circuit shown in FIG. 4. Further, the zener voltages of the zener diodes 70a, 70b, 70c in the prior art are set to 27 V similar to those of the zener diodes 7a, 7b in this embodiment.

The inductive noise interferes with the squibs 6, 60 via a noise injection probe from a noise simulator. The probe is clamped to the wire harnesses 12, 120. The noise simulator applies pulse voltage of a 200-nsec pulse-width, a 500-V amplitude, and a 30-Hz frequency to the probe to thereby cause inductive noise to interfere with the squibs 6, 60.

Figure 2A:
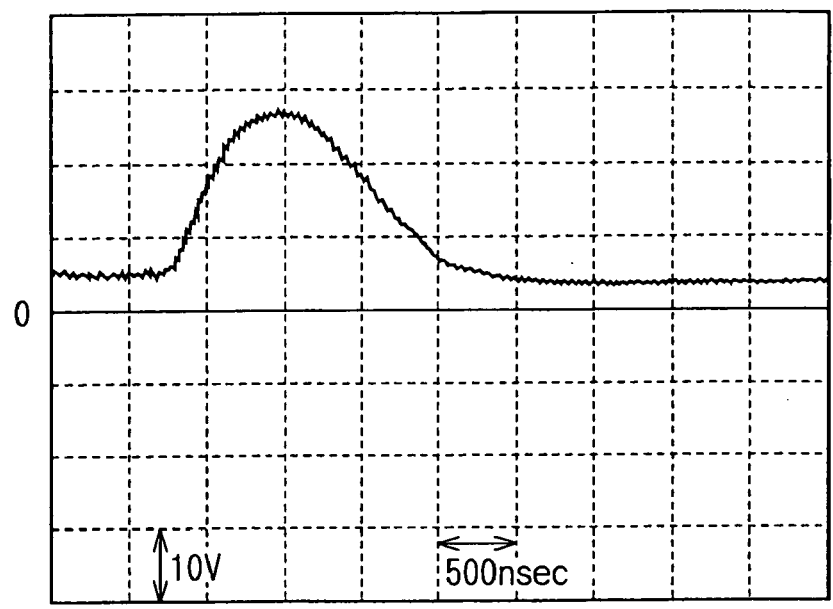
FIG. 2A is a graph of source voltage waveforms in a field-effect transistor in an ignition circuit of a prior art.
Figure 2B:
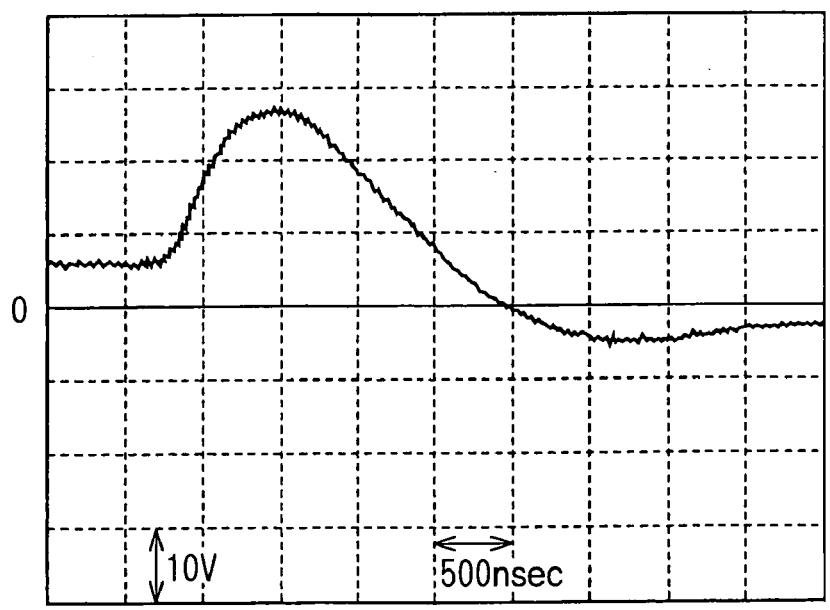
FIG. 2B is a graph of source voltage waveforms in a field-effect transistor in an ignition circuit according to the embodiment.
Figure 3A:
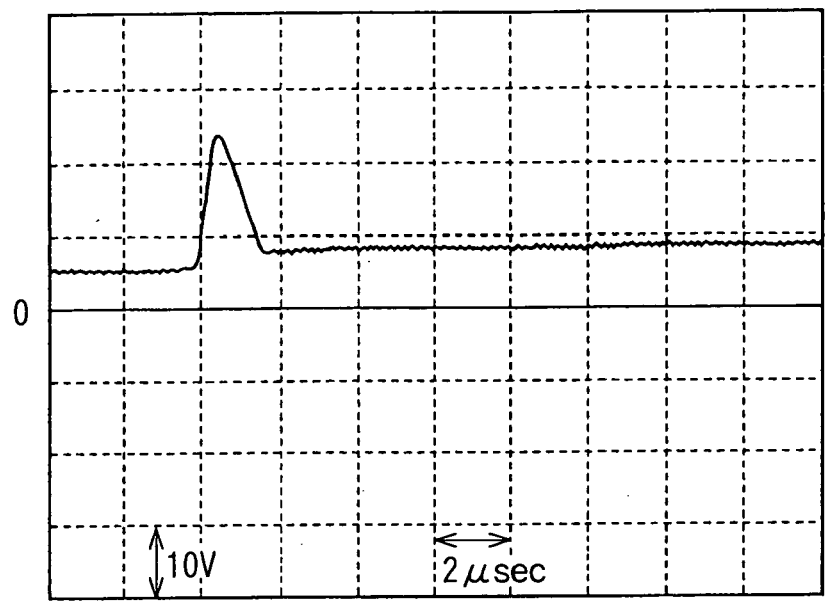
FIG. 3A is a graph of drain voltage waveforms in a field-effect transistor in an ignition circuit of the prior art.
Figure 3B:
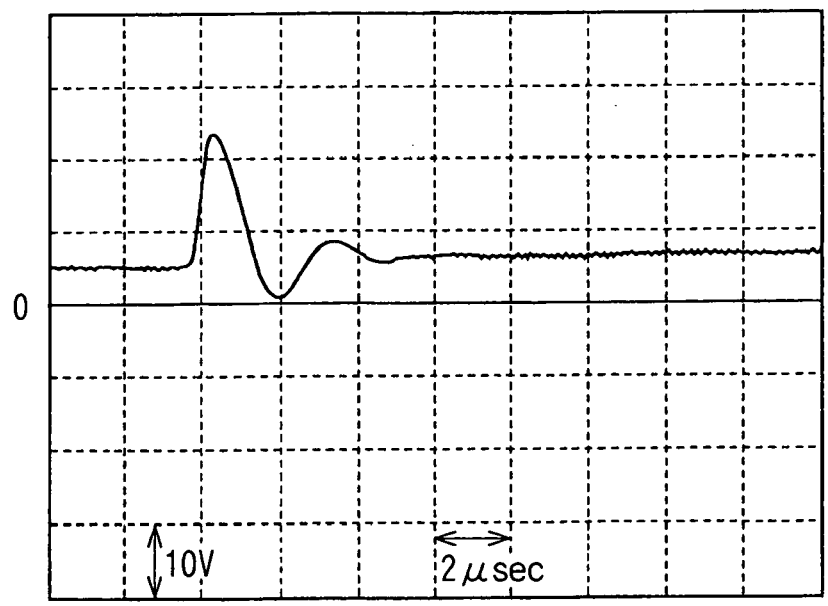
FIG. 3B is a graph of drain voltage waveforms in a field-effect transistor in an ignition circuit according to the embodiment.
Figure 4:
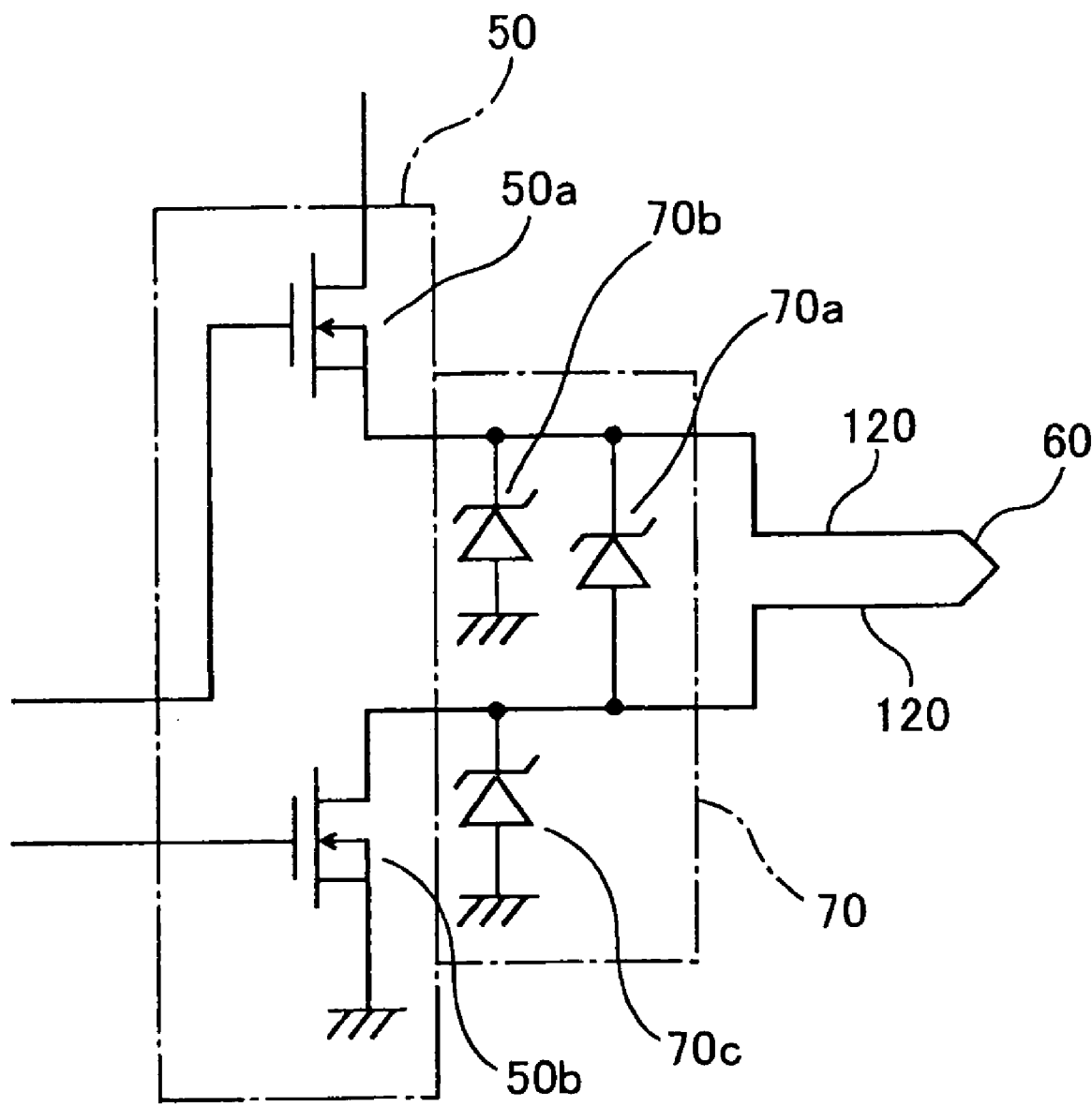
FIG. 4 is a diagram of a circuit of an airbag device of the prior art.

FIGS. 2A, 2B show source voltage waveforms in the field-effect transistor 50a, 5a, respectively, when the inductive noise is applied. FIGS. 3A, 3B show drain voltage waveforms in the field-effect transistors 50b, 5b, respectively, when the inductive noise is applied.

As shown in FIG. 2A, the conventional noise protection circuit 70 suppresses the source voltage induced by the inductive noise interfering with the squib 60, to about 28 V. In contrast, as shown in FIG. 2B, the noise protection circuit 7 suppresses the source voltage of the field-effect transistor 5a induced by the inductive noise interfering with the squib 6, to about 28 V, similarly with the conventional circuit 70. Here, in FIG. 2B, although the source voltage becomes positive voltage, the magnitude of the voltage is −4 V and converges to about 0 V. Therefore, this negative voltage does not cause damage or mal-function to the field-effect transistor 5a.

On the other hand, as shown in FIG. 3A, the conventional noise protection circuit 70 suppresses the drain voltage induced by the inductive noise interfering with the squib 60, to about 24 V. In contrast, as shown in FIG. 3B, the noise protection circuit 7 suppresses the drain voltage of the field-effect transistor 5b induced by the inductive noise interfering with the squib 6, to about 24 V, similarly with the conventional circuit 70. Here, in FIG. 3B, although the drain voltage approaches 0 V once, the voltage converges to about 7 V. Therefore, this voltage behavior does not cause damage or mal-function to the field-effect transistor 5b.

Thus, the noise protection circuit 7 of this embodiment can have the noise protection capability equivalent to the conventional protection circuit 70. Thus, even when the noise interferes with the squib 6 to thereby induce high voltage, the voltage applied to the field-effect transistor 5a, 5b constituting the ignition circuit 5 can be suppressed to about 28 V. Therefore, this structure helps prevent the damage of the field-effect transistors 5a, 5b of the maximum rated 35 V between the source and the drain.

Further, in detail, in the airbag device 1 according to the embodiment, the ignition circuit 5 can be protected from being damaged because of the interfering noise by the noise protection circuit 7 constituted by the two zener diodes 7a, 7b. In comparison to the conventional circuit having three zener diodes, the number of components is decreased, so the noise protection circuit 7 can be designed to be compact and low in cost while securing the noise protection capability.

Further, in this airbag device 1, the two zener diodes 7a, 7b are set to the same zener voltage. Regardless of polarization of the high voltage induced by the noise, the voltage can be effectively suppressed to thereby help prevent the ignition circuit 5 from damage.

It will be obvious to those skilled in the art that various changes may be made in the above-described embodiments of the present invention. However, the scope of the present invention should be determined by the following claims.

What is claimed is:

1. A vehicular occupant protection device comprising:
    an ignition element that is ignited by an ignition current;
    an ignition circuit that supplies the ignition current to the ignition element; and
    a noise protection circuit that includes two zener diodes whose cathodes are facing each other and connected with each other,
    wherein the noise protection circuit is connected in parallel with the ignition element to protect the ignition circuit from noise.

2. The vehicular occupant protection device of claim 1, wherein zener voltages of the zener diodes are equal to each other.

* * * * *